United States Patent [19]

Joyce

[11] Patent Number: 4,651,872

[45] Date of Patent: Mar. 24, 1987

[54] FOLDABLE DISPLAY FOR COMPUTER DISKS

[76] Inventor: Bryan L. Joyce, 4203 W. Kennewick Ave., #13, Kennewick, Wash. 99336

[21] Appl. No.: 816,142

[22] Filed: Jan. 3, 1986

Related U.S. Application Data

[63] Continuation of Ser. No. 697,520, Feb. 1, 1985.

[51] Int. Cl.$^4$ ................................................. B65D 5/50
[52] U.S. Cl. .......................... 206/45.14; 206/44.11; 206/45.2; 206/45.23; 206/45.24; 206/444; 206/806; 40/124.2
[58] Field of Search ...................... 150/147, 149, 52 B; 206/44.11, 45.14, 45, 45.17, 45.2, 45.23, 45.24, 232, 309, 311, 312, 444, 806; 383/22, 24, 27; 40/124.2, 124.4

[56] References Cited

U.S. PATENT DOCUMENTS

| | | | |
|---|---|---|---|
| 1,663,397 | 3/1928 | Bunnell | 40/124.2 |
| 3,392,771 | 7/1978 | Hartley | 150/147 |
| 3,816,948 | 6/1974 | Mooney et al. | 40/124.2 |
| 3,829,995 | 8/1974 | Fakoury | 150/147 |
| 3,959,904 | 6/1976 | Holliday | 40/124.2 |
| 4,237,947 | 12/1980 | Mater | 150/149 |
| 4,312,393 | 1/1982 | Green | 40/124.2 |
| 4,473,153 | 9/1984 | Colanglo | 206/444 |
| 4,508,366 | 4/1985 | Brindle | 206/444 |
| 4,527,692 | 7/1985 | Neuman | 206/45.15 |
| 4,560,068 | 12/1985 | Membrino | 206/806 |

*Primary Examiner*—Joseph Man-Fu Moy
*Assistant Examiner*—David T. Fidei
*Attorney, Agent, or Firm*—Wells, St. John & Roberts

[57] ABSTRACT

A foldable display device includes three serially connected folding sections. Two cover sections may include computer disk receiving pockets. The pockets on each cover section face one another when the covers are folded to a closed condition but will face opposite and outward when the covers are pivoted to an open display condition. A single flap and fastener assembly secures the cover sections in the closed condition and also functions as a brace between the two cover sections when the device is in the open, display condition.

16 Claims, 5 Drawing Figures

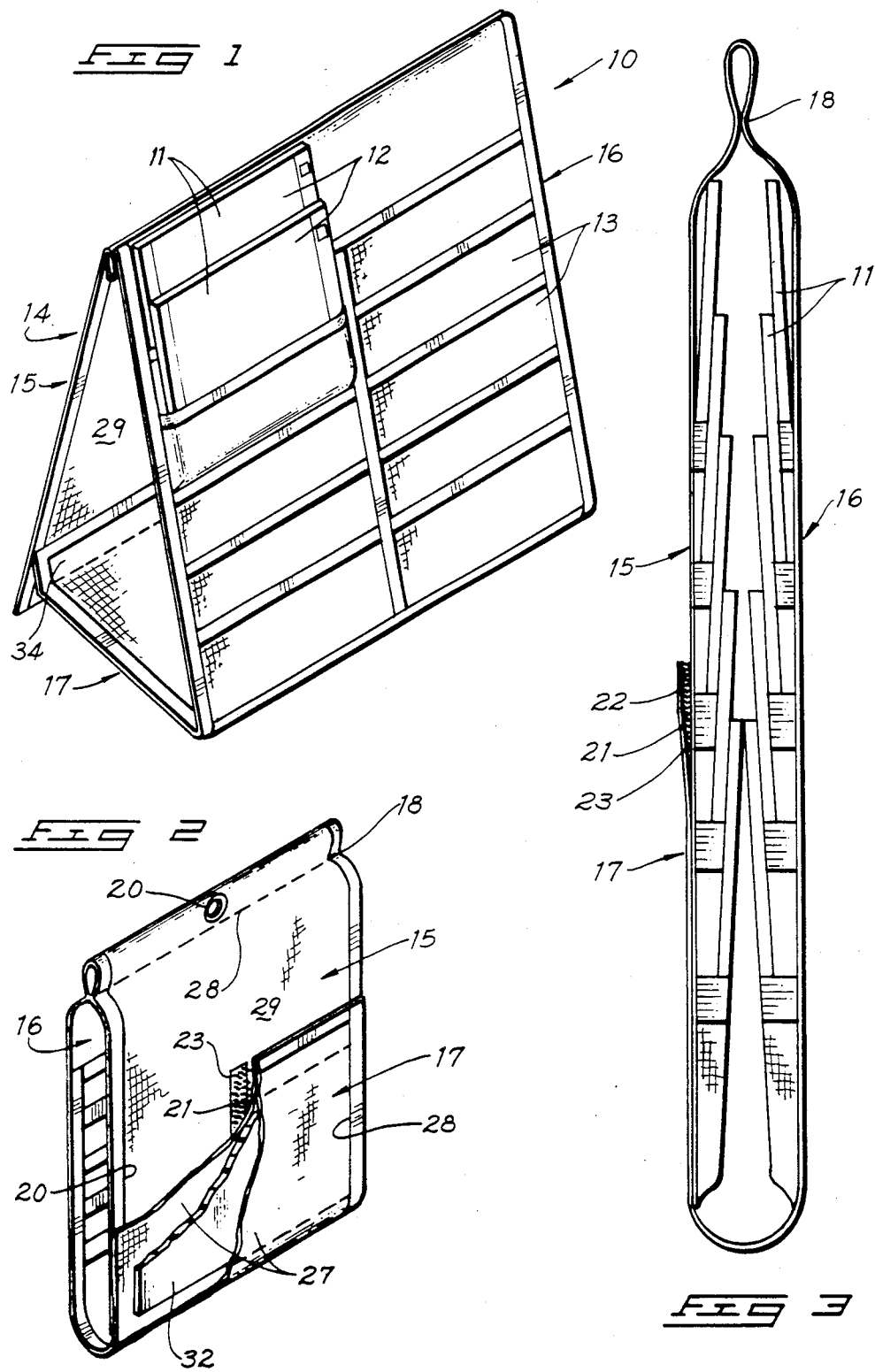

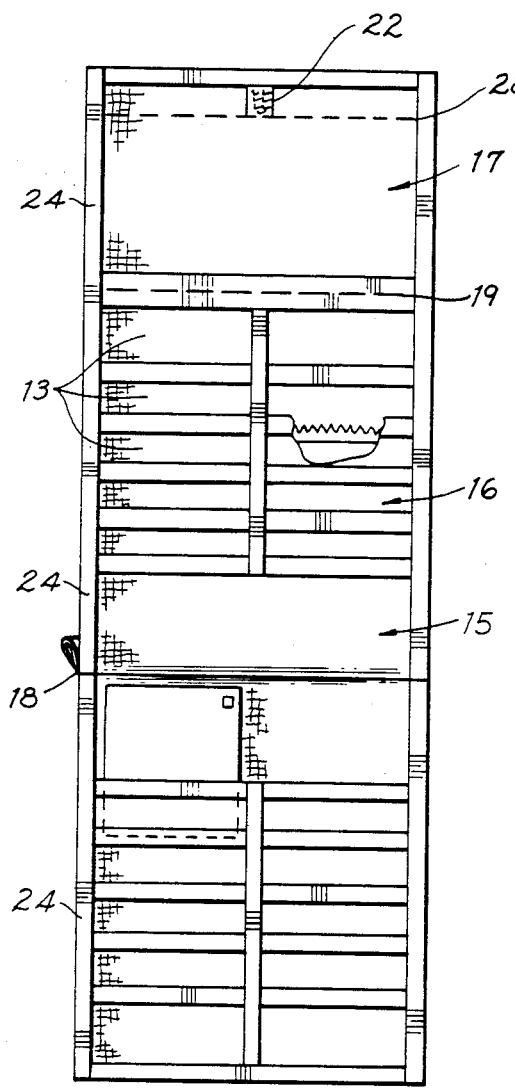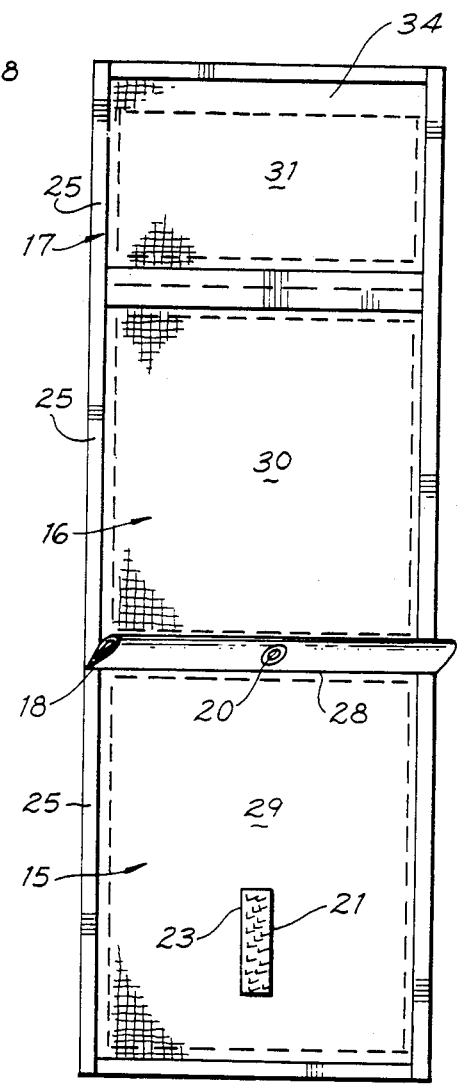

FOLDABLE DISPLAY FOR COMPUTER DISKS

This application is a continuation of application Ser. No. 697,520, filed on Feb. 1, 1985.

FIELD OF THE INVENTION

The present invention relates to storage and display of flat articles of uniform size and shape such as computer disks.

BACKGROUND OF THE INVENTION

Computer owners now have access to a great wealth of "programs" in readily usable form through small computer disks. Information is also stored on such disks and can be referred to later for further use. For example, in word processing, a single disk may be used to store several letters to a single entity. Instead of retaining a paper file, the information may be kept in place on the disk for possible future use. A letter, for example, can be retyped from the disk without need to search out a bulky file and retype an existing, say, form letter. Storage of the disk, rather than the paper file, then becomes a problem.

The small, flat disks usually have a label space available along one flat surface. This label becomes covered when the disks are stacked or nested in "files". Adequate display is also a problem. Discs are not easily "thumbed through" when stored in standard "recipe boxes", and the boxes themselves take up the same desk space whether in use or not.

Computer disk users are in need of a storage and display system that will effectively display a desired number of disks (with labels showing) and that will store disks in a minimum amount of space. There is also need of such a system that is easily carried from one place to another in keeping with the increasing portability of computer products.

A calculator storage device and support is described in U.S. Pat. No. 4,259,568. This device is a folding case having one solid surface for receiving a calculator. The lid for the case is formed in two hinged sections. When closed, both sections of the lid extend over the calculator face and latch onto the opposite casing section. When folded open, one of the cover sections is hinged relative to the other, forming a support to hold the calculator face at an inclined angle. This device is intended exclusively to store and support a calculator for protection in storage and for holding the calculator at a desired angle when in use.

U.S. Pat. No. 4,444,314 discloses a storing device for flat objects such as cards. This device somewhat resembles a "recipe box". The distinguishing feature is the capability of the card receiving pockets to be lifted upwardly into a stepped, partly exposed position. Each pocket then projects beyond the next adjacent pocket to permit access to the various cards held therein. The container or box receiving the movable pockets remains the same identical size and configuration whether in the storage mode or the open, display mode.

U.S. Pat. No. 2,439,868 to Segal discloses a record binder. This device makes use of two rigid cover members foldable along an integral edge. One cover member mounts a number of stacked record receiving pockets. The other member can be folded over the stacked pockets to close and store the records. Alternatively, the cover can be folded backward from the record pockets to form a brace, supporting the record pockets in a substantially upright orientation. There is no provision for latching the cover member in the storage or open, bracing conditions. Furthermore, the record pockets are "stacked" so only one record may be displayed at a single time.

U.S. Pat. No. 3,717,188 to Green discloses a cassette caddy. One form of the caddy includes a flat back member with vertically overlapping cassette receiving pockets. The cassettes are received in such a way that the top edges are exposed one above another in a shingled orientation. Another embodiment shows the lose, flexible cover that can be folded or rolled onto itself to a storage orientation or pulled over the exposed cassette tops and latched to one of the pockets to secure the cassettes in place and protect them from dust or damage.

U.S. Pat. No. 1,499,712 to Wilburger discloses a disk record folio that is somewhat similar to the binder shown in the Segal U.S. Pat. No. 2,439,868. Wilburger makes use of a rigid frame but also includes a latching member on the folding cover than can be secured to a lip adjacent the flat, stacked record pockets. The cover is therefore foldable from a closed, latched orientation covering the exposed surface pocket to an open supporting orientation wherein the record receiving pockets are held in an upright, horizontally stacked orientation. The latching member is used only to hold the covers closed.

The above references disclose attempted solutions to problems of storing various devices including calculators, records, and magnetic tape cassettes, but none specifically address the problem of receiving, storing, and adequately displaying computer disks. The need, therefore, remains for a device that will effectively display computer disks for quick recognition and access and that will also store the same disks in a compact, secure condition for storage and transport.

BRIEF DESCRIPTION OF THE DRAWINGS

The invention is illustrated in the accompanying drawings, in which:

FIG. 1 is a pictorial view of one preferred form of the present display device in an open, display orientation and with two computer disks shown therein;

FIG. 2 is a reduced pictorial view of the display device shown in FIG. 1 and folded to a closed, storage condition;

FIG. 3 is an enlarged end elevation view of the present device with a series of computer disks received and stored therein;

FIG. 4 is a view showing the device folded flat to demonstrate the interconnection of the various cover and flap sections thereof; and FIG. 5 is a view similar to FIG. 4 only showing the opposite surface of the device.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

Reference numeral 10 generally indicates one preferred form of the present invention in the accompanying drawings. The preferred form of the display 10 is intended for use in displaying and storing computer disks 11. Such disks are typically flat, square articles enclosing rotatable magnetic memory "disc". The actual "disc" is therefore enclosed within a usually plastic housing having a flat label area 12 upon which the various markings may be made to identify the material imprinted on the enclosed memory disk. For purposes of this description, the entire assembly including the rigid housing and internal rotatable disk will be referred to simply as a disk 11.

The present display 10 may be constructed of commercially available fabric sewn or otherwise fastened together along parallel hinge axes to produce a one-piece construction as shown in FIGS. 4 and 5 that can be quickly and easily transformed between the conditions shown in FIGS. 1 and 2. Details of the structure that facilitate this transformation will be given below.

The display is generally comprised of a unitized display body 14 made up of a first cover section 15, a second cover section 16, and a flap section 17. These sections are all joined together serially by integral hinge areas. A first integral hinge is situated at 18 connecting covers 15 and 16. A second integral hinge 19 connects flap 17 and cover 16. A carrying tab 20 is also situated at the axis of hinge 18. The hinge axis is defined by a transverse row of stitches through the cover material.

A fastener means is generally shown at 21 for selectively securing the flap section and first cover section 15 together in the storage position shown in FIGS. 2 and 3. It is also useful in securing the flap in position between the spread cover sections 15 and 16 when in the "A" shaped display condition as shown in FIG. 1.

The fastener means 21 may include a first fastener member 22 on the flap 17. A second fastener member 23 is situated on the first cover 15. FIG. 4 indicates the first fastener member 22 on an "inside surface" of the flap 17 while the second fastener member 23 is situated along the first cover section along an "outside" surface thereof. The two fastener members 22 and 23 may be chosen from commercially available fabric "hook and loop" fasteners. They may be selectively joined to secure the covers in the closed position or, alternatively, in the open position depending upon the orientation of the covers and flap.

The second fastener member 23 is elongated in the longitudinal direction of the serially connected sections 15 through 17 to facilitate adjustment in both closed and open conditions of the device. In the closed condition, the elongated fastener member allows the covers to be closely positioned together according to the number of disks 11 received within the several pockets 13. The elongated second fastener member 23 facilitates angular adjustment of the flap section 17 to allow desired variation in the "stance" of the two cover members 15, 16 in their open display condition. The first fastener member 22 can be positioned higher up along the second member to effectively hold the cover members to a relatively narrow stance. The first member can be attached to the lower end of the second member 23 if a wider stance between the angled cover sections is desired. This adjustment feature facilitates selective change of the "footprint" occupied by the device when opened and positioned on the surface of a desk.

It is important to note the dual function of the fastening members and flap. The fasteners and flap are firstly used to effectively hold the two covers together in the storage configuration with the article receiving pockets facing one another. The fasteners connected in this manner hold the two cover sections securely together in a very compact and readily transportable condition.

The very same fastener members and flap are used in the open, operative condition to again secure the covers. This time, however, the covers are situated with the pockets facing opposite and outwardly and oriented in the "A" configuration shown in FIG. 1. The flap 17 becomes a brace, securely holding the two cover sections in this "A" configuration (preventing collapse) while the engaged fastener members secure the otherwise free flap end to the outer surface of the first cover member.

As briefly indicated above, the present display is constructed of several serially connected sections 15 through 17. The sections are relatively planar and, for purposes of further description, include inside planar surfaces 24 (all shown in FIG. 4) and outside planar surfaces 25 (all shown in FIG. 5). The article receiving pockets 13 are formed along at least one of the planar inside surfaces 24 of cover section 15 or 16. Both sections 15 and 16 may, as shown, include pockets if so desired.

The article receiving pockets are arranged in a "shingled" manner such that one disk will partially overlap the next succeeding disk. This condition is illustrated in FIG. 1 where two computer disks 11 are shown. The lower disk of the two partially overlaps the top disk, leaving an area of the label area 12 clear for inspection. This spacing also facilitates grasping a selected disk for removal from the device. The pockets may be formed from material similar to that used in the remainder of the device and attached in an appropriate manner to the respective surfaces.

It should be noted that the number of pockets may vary with the construction of the device. For example, a single row of pockets could be used instead of two as shown. Or, more than two rows of pockets 13 may be used, depending upon the needs of the purchasers. But the basic construction features disclosed herein will remain essentially the same, regardless of the number or arrangement of pockets 13.

As indicated above, the present device may be formed of fabric sewn or otherwise secured together along seams 28 to form sections 15–17 and pockets 13. Seams 28 are preferably sewn, but may be glued, or otherwise formed between adjacent fabric panels 27 to specifically define the various sections and hinge sections. These seams also define enclosures for reinforcing stays 32.

An envelope 29 is formed preferably by stitching between fabric panels defining the first cover section 15. Another stitched envelope 30 defines the second cover section 16, while a third stitched envelope 31 defines a portion of the flap 17. Flat rectangular reinforcing stays 32 are received in each of the envelopes 29 through 31 to stiffen the otherwise flexible fabric material. The stays 32 may be formed of somewhat rigid plastic material and sized to complement the overall shape of the individual envelopes. Stitching extending transversely across the display body and situated longitudinally between adjacent cover sections defines the three parallel hinge axes for the covers and flap.

The envelope 31 and reinforcing stay 32 provided in the flap section 17 are shortened to leave a flexible fabric lip 34 across the free end edge of the flap. The lip 34 will flex freely to accommodate positioning of the first fastener member 22 (mounted thereon) as shown in FIGS. 1 and 3.

Operation to convert the present display 10 from the storage condition shown in FIGS. 2 and 3 to the operative display condition shown in FIG. 1 is started simply by disengaging the fastener member 22 from the second fastener 23. If typical loop and hook fabric fasteners are used, this may be accomplished simply by holding the two juxtaposed cover sections 15 and 16 in one hand, grasping the lip 34 in the other hand, and pulling in opposite directions. The fasteners will disengage and allow the two cover sections and flap to pivot freely about their various hinge axes.

The covers may be opened in a manner similar to a book, with the folding continuing about the hinge 18 until the previously outside surfaces 25 face one another and form an acute angle. The flap is likewise folded backwardly about the hinge 19 toward the first flap 15. The lip 34 is then grasped adjacent the first fastener member 22, which is then secured with the second fastener member 23. This is done simply by pressing both fastener members together.

This completes transformation of the device from the storage to the open, display condition. Discs received within the various pockets will be readily visible and easily accessible for removal and replacement from either side of the open device. The flap, securely positioned between the "A" framework of the covers, holds the covers firmly in position, preventing collapse.

Converting the display device from the open, to display orientation to the closed condition is simply a matter of reversing the above described procedure. The two fastener members are pulled apart and the covers are folded back onto one another. The flap is then folded on its axis to overlap the outer surface of the first cover section 15. The fastener members are then pressed together, securing the cover sections in place. The closed compact device can then be easily stored or transported with the disks safe and secure between the cover sections.

The closing procedure brings the carrying tab 20 into position for easy access. The user can grasp and carry the device by the tab 20. This avoids potential damage to the disks held between the cover sections that could otherwise be caused by tightly gripping the device by the two cover sections. The carrying tab 20 may also include a grommet 39 to facilitate storage of the device when in its closed condition.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A foldable computer disk display for uniformly sized flat computer disks having oppositely facing flat face surfaces and side edges, and with each having a label on a face surface adjacent a side edge thereof, said display comprising:
   a display body formed of integral first and second cover sections having top edges joined integrally for folding motion about a first hinge axis;
   said first and second cover sections having bottom edges opposed to said top edges;
   said body further including an integral separately foldable flap section foldably joined to the bottom edge of the second cover section along a second hinge axis;
   wherein the body is foldable about the first and second hinge axes between a closed storage and transport condition with the cover sections overlying one another and with the single flap section folded over and flush against the first cover section, and an open display condition with the cover sections folded open to an "A" shaped configuration;
   fastener means including a first fastener member on the flap section and a second fastener member on the first cover section for selectively (a) securing the flap section to the first cover section in an overlapping relationship therewith to hold the cover sections together in the closed storage and transport condition; and (b) securing the flap in a position extending from the second hinge axis at the bottom edge of the second cover section to the first cover section to brace the cover sections when in their "A" shaped open display condition; and
   computer disk receiving pocket means on the display body for receiving and releasably holding a plurality of computer disks with the labels thereof projecting clear of the body and facing outwardly for viewing and manual access and with the facing surfaces in an overlapping shingled arrangement when the body is in the open display condition, and for supporting the computer disks between the cover sections when the body is in the closed storage and transport condition.

2. The foldable display as claimed by claim 1 wherein each of the cover sections includes an inside and outside planar surface and the pocket means is situated on both cover sections along the inside surfaces thereof; and
   wherein the cover sections are foldable such that the inside surfaces thereof face one another in the closed storage and transport condition and face outwardly opposite one another in the open display condition.

3. The foldable display as claimed by claim 1 wherein the top edges of the first and second cover sections are formed of a flexible fabric and joined by stitching defining said first hinge axis; and further comprising:
   an integral carrying tab means extending from the hinge between the two cover sections exposed for gripping when the cover sections and flap are in the closed storage and transport condition.

4. The foldable display as claimed by claim 1 wherein the cover sections and single flap are connected serially and wherein the hinge axes are parallel to one another.

5. The foldable display as claimed by claim 1 wherein the single flap section is formed of a flexible fabric and extends from a first end integral with and foldably joined to the bottom end of the second cover section, to a remote end and includes;
   a flat reinforcing stay section extending from the first end to an edge;
   an integral flexible lip extending from the stay section edge to the remote flap section end; and
   wherein the first fastener member is located on the flexible lip.

6. The foldable display as claimed by claim 5 wherein the cover and flap sections are formed of reinforced flexible fabric and are connected serially, with the cover sections being joined integrally along a seam defining the first hinge axis and the flap section being joined along another seam to the second cover section at the second hinge axis and wherein the second hinge axis is parallel to the first hinge axis.

7. The foldable display as claimed by claim 1 wherein the fastener members are hook and loop type fabric fasteners; and wherein one of the fastener members is elongated in a longitudinal direction relative to the display body and is positioned on the display body with one end for receiving and securing the remaining fastener member in the closed transport condition with the flap member flush against first cover section and with a remaining end for receiving and securing the remaining fastener member and flap member between the cover sections when in the open "A" shaped condition.

8. The foldable display as claimed by claim 7 wherein the flap section includes an integral lip thereon and wherein the second member is positioned on the first cover section and with its length substantially perpendicular to the bottom edges of said cover sections and wherein the first fastener member is situated on the flexible lip of the flap section.

9. The foldable display as claimed by claim 8 wherein the first and second cover sections are formed of reinforced flexible fabric and are joined along a seam defining said first hinge axis; and an integral carrying tab formed of said fabric extending from the first hinge axis between the cover sections when the cover sections and flap section are in the closed storage and transport condition.

10. The foldable display as claimed by claim 9 wherein the cover sections are defined by interconnected envelopes of flexible fabric, each enclosing a reinforcing stay and wherein the first hinge axis between the cover sections is formed by a seam between the envelopes;

wherein the cover sections include an inside and outside planar surfaces;

and wherein the pocket means is comprised of overlapping layers of flexible fabric affixed to the cover sections and situated on both cover sections along the inside surfaces thereof; and wherein the first and second cover sections are foldable about the first hinge axis such that the inside surfaces thereof face one another in the closed storage and transport condition and face opposite one another and outward in the open display condition.

11. A foldable computer disk display for flat rectangular computer disks having oppositely facing surfaces between side edges and with each having a label adjacent one side edge, the computer disk display comprising:

an elongated display body formed of a flexible fabric formed into a series of three envelopes including a first envelope joined to a second envelope along a first seam and a third envelope joined to the second envelope along a second seam parallel to the first seam, said seams defining first and second parallel hinge axes about which the envelopes may be folded;

wherein each envelope encloses a flat rectangular reinforcing stay;

wherein the first envelope and enclosed stay forms a first cover section having a top edge defined by the first seam and an opposed bottom edge;

wherein the second envelope and enclosed stay forms a second cover section having a top edge defined by the first hinge axis and an opposed bottom edge defined by the second hinge axis;

wherein the third envelope and enclosed stay forms a flap section connected integrally to the second cover section along the second hinge axis;

wherein the cover section and flap are foldable about the first and second hinge axes between a closed storage and transport condition with the cover sections overlapping one another and with the flap section folded over and flush against the first cover section, and an open display condition with the cover sections folded open to an "A" shaped configuration;

fastener means including a first fastener member on the flap section and a second fastener member on the first cover section for selectively (a) securing the flap section to the first cover section in an overlapping relationship thereto to hold the cover sections together in the closed storage and transport condition; and (b) securing the flap section in a position extending from the second hinge axis at the bottom edge of the second cover section to the first cover section to brace the cover sections when in their "A" shaped open display condition; and computer disk receiving pocket means on the first and second envelopes for receiving and releasably holding a plurality of computer disks with the labels projecting clear of the body for viewing and manual access and with the facing surfaces in an overlapping shingled arrangement when the body is in the open display condition, and for supporting the computer disks between the cover sections when the body is in the closed storage and transport condition.

12. The foldable computer disk display of claim 11 further comprising an integral carrying tab formed of the flexible fabric between the first and second envelopes and joined integrally therewith along the first seam.

13. The foldable computer disk display of claim 11 wherein each of the cover sections includes an inside and outside planar surface and the pocket means is situated on both cover sections along the inside surfaces thereof; and wherein the cover sections are foldable such that the inside surfaces thereof face one another in the closed storage and transport condition and face outwardly opposite one another in the open display condition;

wherein the pocket means is formed of overlapping sections of the flexible fabric attached along seams to the cover sections and spanning the inside surfaces thereof.

14. The foldable computer disk display of claim 13 further comprising an integral carrying tab formed of the flexible fabric between the first and second envelopes and joined integrally therewith along the first seam.

15. The foldable computer disk display of claim 11 wherein the flap section includes a flexible lip formed integrally of the flexible fabric and wherein the first fastener member is located on the flexible lip.

16. The foldable computer disk display of claim 15 wherein the fastener members are formed of hook and loop type fasteners and wherein the second fastener member is elongated and oriented substantially perpendicularly to the first hinge axis, and extends from an end adjacent the second seam toward the first hinge seam.

* * * * *